May 2, 1961

F. P. MARTIN 2,982,080

MULTIPLE UNIT CONTOUR MOWER

Filed Nov. 8, 1957

INVENTOR.
Fred P. Martin.
BY
Fishburn and Gold
ATTORNEYS.

May 2, 1961 F. P. MARTIN 2,982,080
MULTIPLE UNIT CONTOUR MOWER
Filed Nov. 8, 1957 5 Sheets-Sheet 2
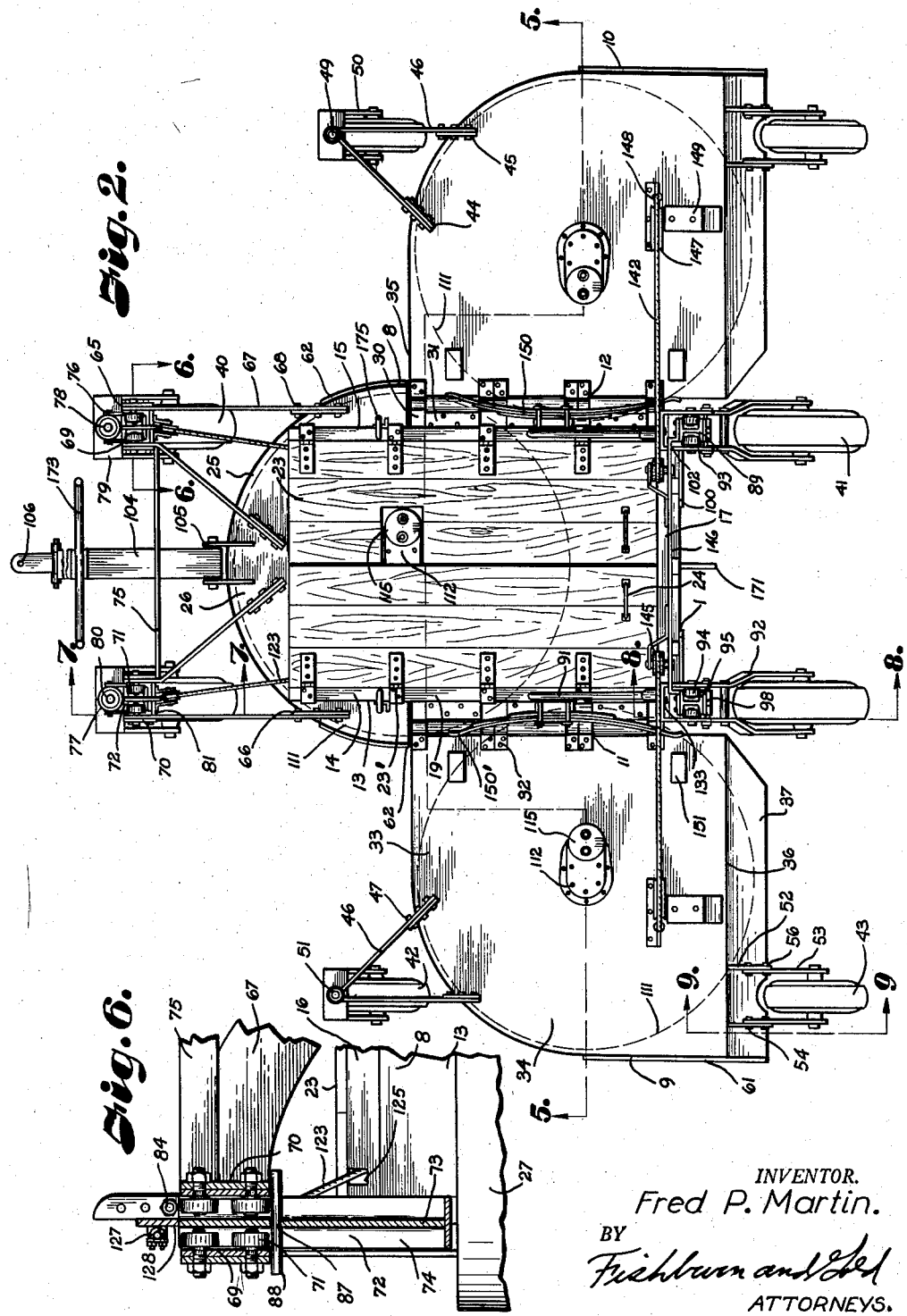
INVENTOR.
Fred P. Martin.
BY
ATTORNEYS.

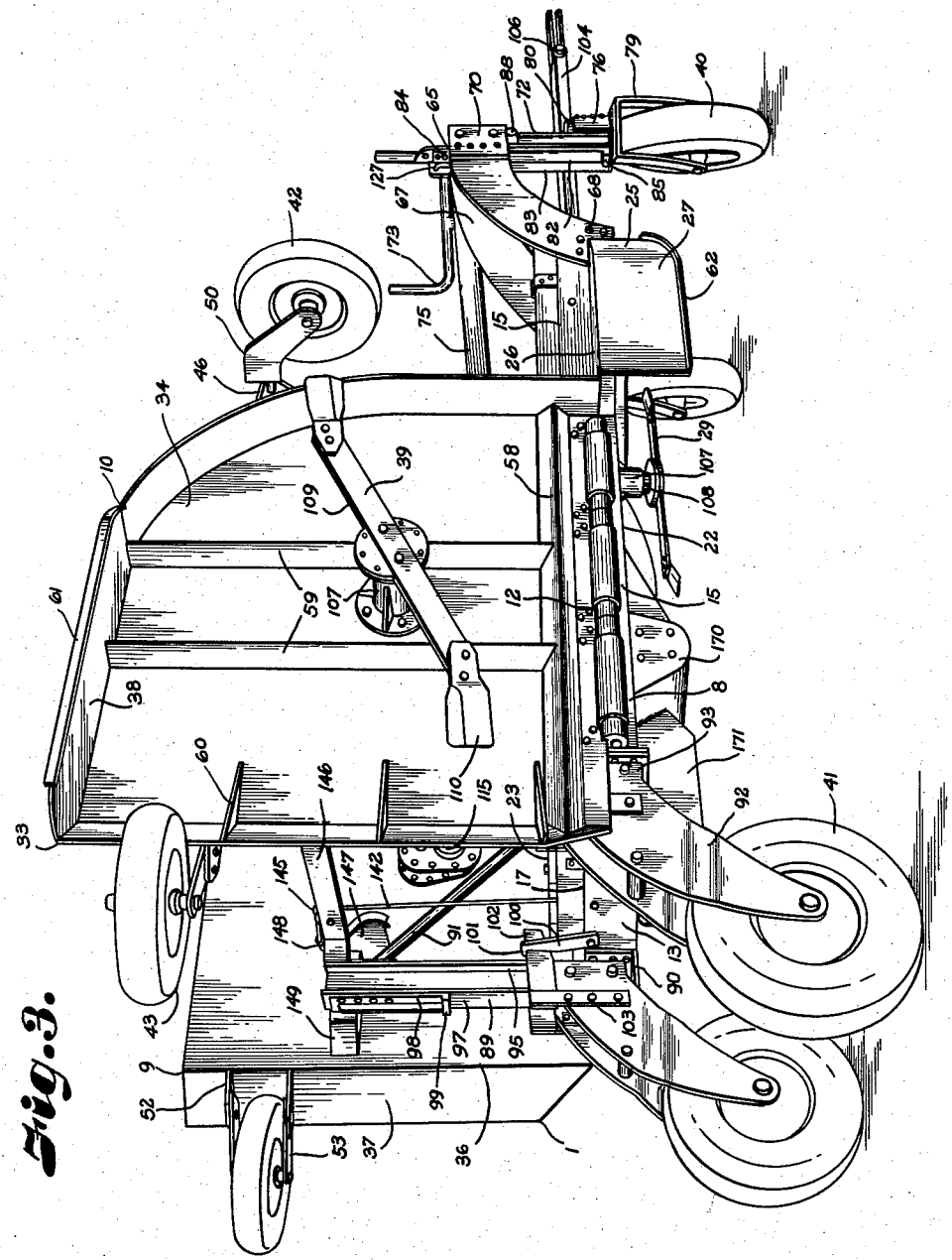

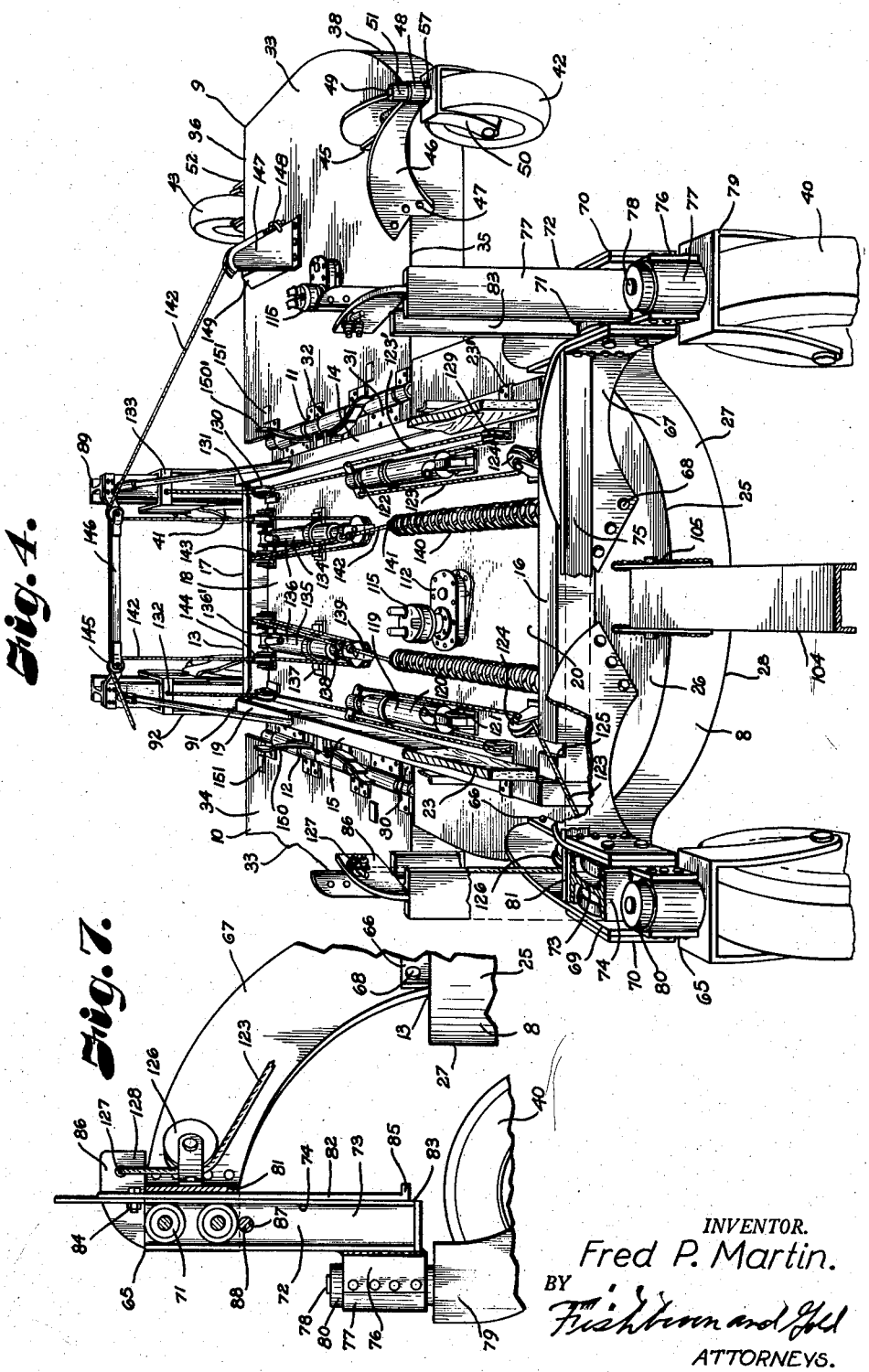

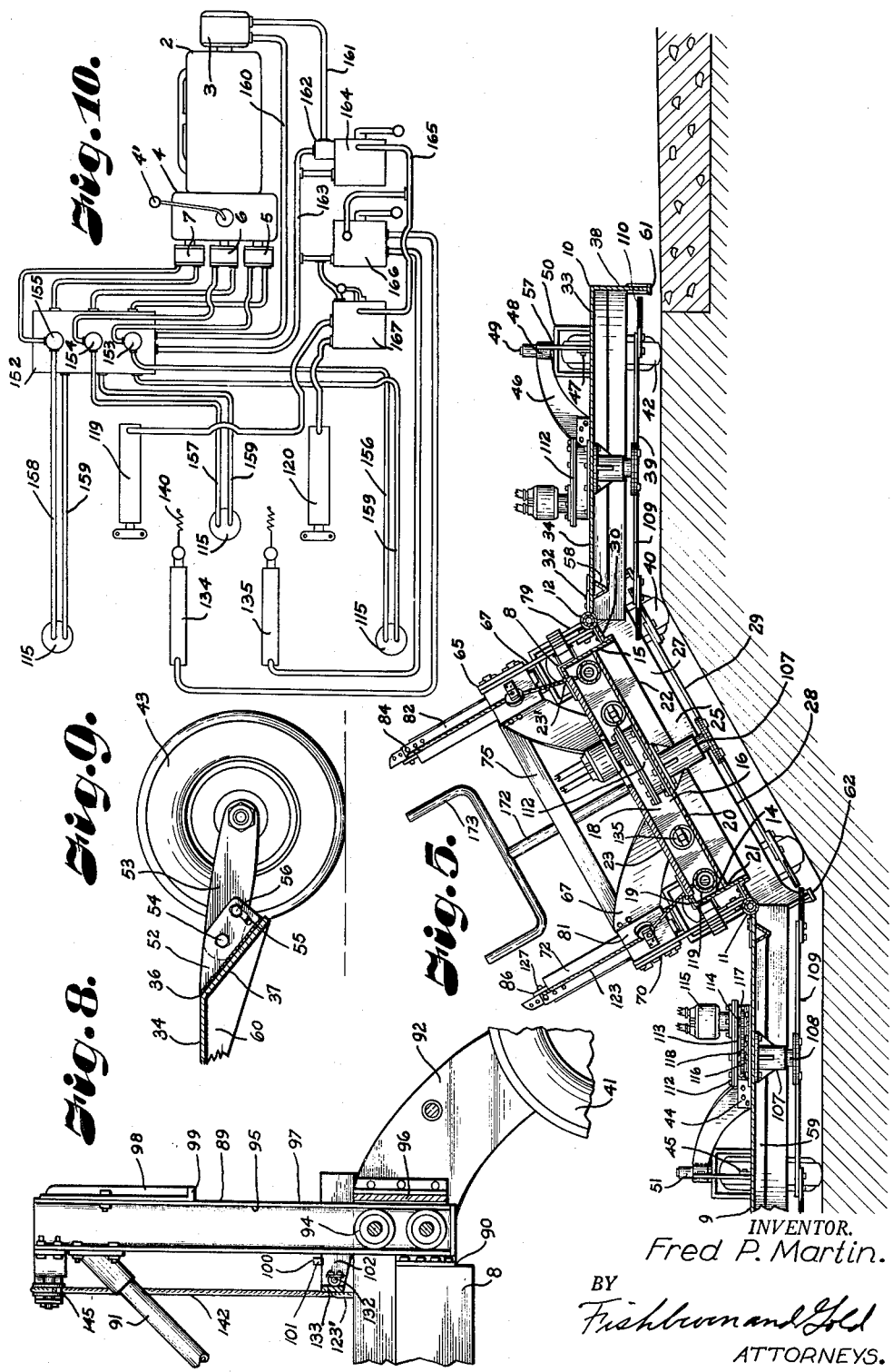

ated May 2, 1961

2,982,080
MULTIPLE UNIT CONTOUR MOWER

Fred P. Martin, 700 E. 8th St., Topeka, Kans.; Charlotte J. Martin, executrix, and The First National Bank of Topeka, executor, of the estate of said Fred P. Martin, deceased, assignors of one-half to Charles H. Martin, one-sixth to Charlotte J. Martin, one-sixth to Mary Alice McRae, and one-sixth to Nancy L. Martin Pryor Filed Nov. 8, 1957, Ser. No. 695,399

5 Claims. (Cl. 56—25.4)

This invention relates to mowing machines, and more particularly to a novel rotary mowing apparatus which will substantially follow the contour of the terrain while cutting grass, weeds and the like to desired heights.

The objects of the present invention are to provide a novel mowing apparatus supported on ground-engaging wheels and adapted to be moved over terrain to be mowed with elevating apparatus for raising and lowering the cutting elements relative to the ground; to provide such a rotary mower apparatus having a frame with a plurality of hingedly connected sections with power driven cutter bars rotatably mounted on each frame section for cutting grass and the like thereunder with structure for swinging each of said sections up and down; to provide such a mowing apparatus wherein the frame sections are adjustably supported on ground-engaging wheels for varying the height of the cut from the terrain over which it operates with power means for effecting such adjustment; to provide such a mowing apparatus having a plurality of hingedly connected frame sections with apparatus for swinging one section upwardly relative to another to reduce the width of the swath to be mowed and also reduce the width of the apparatus for transportation; to provide such a rotary mowing apparatus adapted to be towed or otherwise moved by a motor driven vehicle with a fluid pressure supply and controls connected to cutter driving means and elevating means on the mowing apparatus for effecting the operation thereof; to provide such a mowing apparatus wherein the power for driving the rotary mowing cutters and elevating structure is derived from a motor driven vehicle and controlled by an operator thereon; to provide such a mowing apparatus with adjustable height limit structures for cooperating with the elevating mechanism in controlling the mowing height; and to provide a mowing apparatus that is easily operated and controlled with a flexibility of use for economically mowing wide swaths such as highway shoulders in substantial conformance with the contour thereof and that is of durable, long-life, easily maintained structure.

In accomplishing these and other objects of the present invention, I have provided improved details of structure, the preferred forms of which are illustrated in the accompanying drawings, wherein:

Fig. 2 is a plan view of the rotary mowing apparatus.

Fig. 3 is a perspective view of the rotary mowing apparatus in elevated position for transportation.

Fig. 4 is a partial perspective view of the rotary mowing apparatus looking from the front thereof with portions broken away to better illustrate the elevating mechanism.

Fig. 5 is a transverse sectional view through the rotary mowing apparatus, taken on the line 5—5, Fig. 2, with the sections positioned at angular relationship to follow the contour of the terrain.

Fig. 6 is a sectional view through a front wheel standard and mounting therefor, taken on the line 6—6, Fig. 2.

Fig. 7 is a partial detail vertical sectional view through the mower on the line 7—7, Fig. 2, showing a front wheel mounting with the mower in elevated position.

Fig. 8 is a partial detail sectional view of a rear wheel mounting, taken on the line 8—8, Fig. 2, with the center section in elevated position.

Fig. 9 is a vertical sectional view of a side section rear wheel mounting, taken on the line 9—9, Fig. 2.

Fig. 10 is a diagrammatic view of the hydraulic drive and controls for the rotary mowing apparatus.

Figure 1:
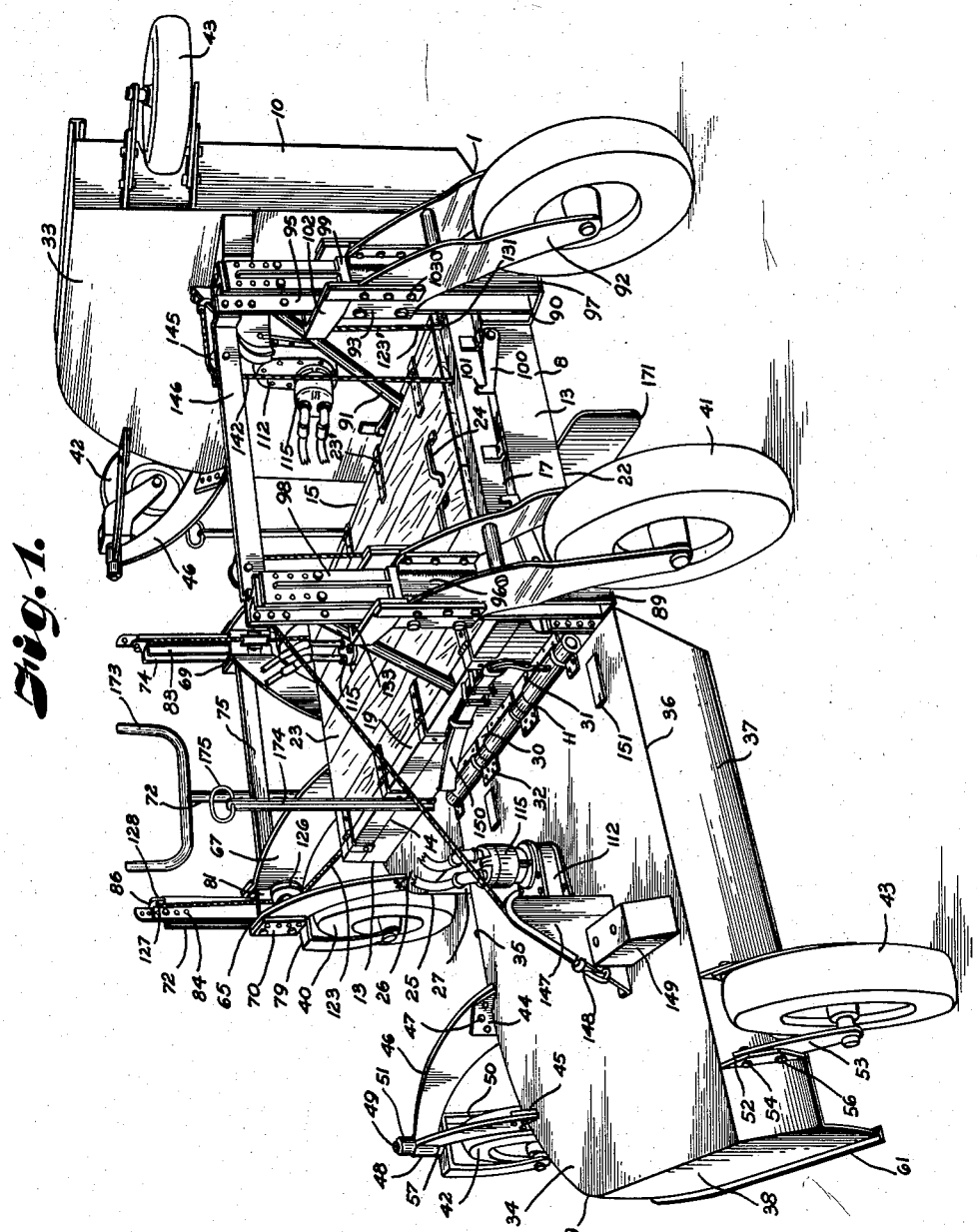
Fig. 1 is a perspective view of a rotary mowing apparatus embodying the features of the present invention, looking at the left rear thereof with one of the frame sections elevated to inoperative position.

Referring more in detail to the drawings:

1 designates a rotary mowing apparatus adapted to be connected to and drawn by a tractor or other motor driven vehicle having an engine 2 thereon driving an hydraulic pump 3 and having a transmission mechanism in a housing 4 operatively connecting the engine 2 with hydraulic pumps 5, 6 and 7 to supply hydraulic fluid under pressure for use, as later described, while the vehicle is moving the mowing apparatus 1 over terrain.

The mower apparatus 1 preferably includes a center section 8 and side sections 9 and 10 hingedly connected to the center section by suitable hinges 11 and 12 respectively with the hinge axes extending longitudinally of the direction of travel of the mower apparatus. The center section 8 has a frame 13 which includes spaced longitudinal side members 14 and 15 connected by suitable transverse members 16 and 17 to form side, front and rear walls of a box-like enclosure 18, said walls each having inwardly turned flanges 19 on their upper edges as illustrated in Fig. 5. A bottom wall 20 extends between said side, front and rear walls with its peripheral edges suitably secured thereto as at 21 by welding or the like, the bottom wall 20 preferably being suitably spaced above the lower edges 22 of said side, front and rear walls and spaced downwardly below the flanges 19 a suitable distance to contain equipment as later described.

Cover doors 23 have their side edges hingedly mounted by hinge members 23' to the flanges 19 whereby said cover doors form a top closure for the container enclosure 18, said doors having handles 24 adjacent their rearward ends for facilitating opening of same.

A housing 25 is arranged on the forward portion of the frame 8 and includes a top wall 26 with a cut-out to fit the outer surfaces of the side members 14 and 15 and the forward transverse members 16 to which said top wall 26 is suitably secured as by welding. The housing 25 is preferably substantially semi-circular and has a depending wall 27 extending downwardly whereby the lower edge 28 is adapted to be spaced from the ground during normal mowing operations to serve as a forward guard for a cutting element 29 as later described. The frame 8 has lateral extensions 30 suitably secured adjacent the lower edges 22 of the side members 14 and 15 whereby said extensions extend outwardly substantially on a level with the top wall 26 of the housing 25, said extensions 30 serving as a mounting for hinge parts 31 to cooperate with hinge parts 32 mounted on housings 33 of the side sections 9 and 10, said parts 31 and 32 being portions of the hinges 11 and 12.

The housings 33 preferably include top walls 34, the forward edge 35 of which is substantially at the rear of the top wall 26 of the housing 25 and the side section top walls 34 terminate at their rear edges 36 in a downwardly and rearwardly inclined wall 37. The side sections also have depending walls 38 at the forward and side edges to cooperate with the rear wall 37 in forming a housing for side section cutting elements 39 as later described.

The mowing apparatus is supported on ground-engaging wheels, there being center section forward wheels 40, center section rear wheels 41 and side section front wheels 42 and rear wheels 43. The side sections 9 and 10 each have spaced upstanding ears 44 and 45 suitably secured as by welding to the housings 33 with forwardly converging arms 46 fixed as by bolts 47 to the ears 44 and 45 with said arms terminating in a bearing 48 in which is rotatably mounted a spindle 49 of a yoke 50 rotatably mounting the front wheel 42 of the respective side section, the yoke being such that the wheel 42 is provided with a caster mounting relative to the bearing member 48. A collar 51 is suitably secured to the spindle 49 to retain the spindle in the bearing. Each of the side sections 9 and 10 have laterally spaced rearwardly extending plates 52 on which a pair of arms 53 are pivotally mounted as by a bolt 54 whereby the arms extend rearwardly therefrom and rotatably support the side section rear wheels 43 therebetween. The plates 52 have slots 55 and a bolt 56 extends therethrough and into the arms 53 whereby the arms have vertical swinging movement for adjusting the height of the rear portions of the housings 33 relative to the ground when the wheels 43 are engaged therewith, tightening of the bolts 56 retaining the arms 53 in adjusted position. The wheels 42 and 43 are preferably substantially in alignment in a line parallel to the direction of movement of the mowing apparatus and are adjacent the lateral outer edges of the side sections to cooperate with the hinges 11 and 12 in supporting the side sections on the center section. The height at which the side section front wheels 42 will support the side housings 33 may be varied by the use of spacers 57 of different lengths between the bearings 48 and the yoke 50.

The side section housings 33 are preferably provided with longitudinal reinforcing members 58 and transverse members 59 and a plurality of spaced gusset plates 60 secured to the top wall 34 and rear wall 37 to provide a rigid structure. Also, a skid member 61 is secured to the lower edge of the side wall 38 to both reinforce same and serve as a wear plate in the event the side wall should come in contact with terrain over which the mower is being moved. A similar stiffening flange 62 is arranged on the lower edge of the side portions of the wall 27 of the center cutter housing 25.

The center section 8 has front wheel mountings 65, each of which includes spaced ears 66 suitably secured as by welding to the forward portion of the housing 25 and having forwardly converging arms 67 secured to the ears by bolts 68 and terminating in laterally spaced parallel plates 69 with back-up or reinforcing plates 70 suitably secured to the exterior thereof. Each of the plates 69 have vertically spaced rollers 71 rotatably mounted thereon between said plates for cooperation in defining guides for standards or posts 72. The standards 72 illustrated in the accompanying drawings are in the form of H-beams arranged with the webs 73 thereof in vertical planes parallel with the direction of travel of the mower whereby the flanges 74 are in vertical transverse planes with the inner surfaces of said flanges engaging the rollers 71. A transverse brace 75 has its ends connected to the adjacent front wheel supporting arms at the rear of the plate portions thereof to give rigidity and stability to the structure. The standards 72 have forwardly extending portions 76 adjacent the lower ends thereof secured to bearing members 77 which rotatably mount spindles 78 on vertical axes, said spindles extending upwardly from yokes 79 that rotatably mount the wheels 40, said yoke being such that the wheels 40 have a caster mounting. The spindles 78 are held in the bearings by means of collars 80 secured to said spindles above the bearing members 77. The rear portions of the plate members 69 of the arms 67 have transverse wear plates 81 secured therebetween and adapted to have sliding engagement with a stop plate 82 secured to the rear flanges 83 of the standards 72. Said stop plate 82 is suitably secured to the flanges of the H-beam standards by means of bolts 84 whereby the stop plate may be adjusted vertically relative to the standards. The lower ends of the stop plate have projections 85 adapted to be engaged by the lower end of the plate 81 when the center frame is lowered to cutting position, the adjustment of the position of the plate projection 85 serving to set the height of the cut of the mower. The standards 72 have stop members 86 secured to the upper ends thereof and extending rearwardly therefrom for engaging the upper edge of the plates 81 when the center section is raised to its maximum limit. The webs 73 of the standards preferably have apertures 87 to receive lock pins 88 to engage under the plates 69 when the center section is in elevated position for transportation thereby providing a safety lock when the structure is in traveling position.

In the mounting for the rear wheels 41 on the center section, there are rear standards or posts 89 in the form of H-beam sections having their lower ends suitably fixed as by brackets 90 to the rear transverse members adjacent the opposite sides of the frame 8 whereby the standards extend vertically from said frame. The upper portions of the standards 89 are each connected to upper end portions of brace rods 91 which have their lower ends secured to the side members 14 and 15 in spaced relation to the standards. The center section rear wheels 41 are rotatably mounted in spaced legs 92 which terminate at their upper portions in spaced plates 93 adapted to straddle the standards or posts 89. Vertically spaced rollers 94 are mounted on each of the plate members 93 and extend inwardly therefrom to rollingly engage the flanges 95 of the standards 89 and cooperate with a wear plate 96 secured across the plate members 93 and transversely thereof for slidably engaging the rear face 97 of the flanges 95 of the standard 89 and cooperate with the rollers 94 in eliminating looseness in the slide mounting of the wheel supports. A stop member 98 is adjustably mounted on the standard 89 adjacent the upper portion thereof with an abutment portion 99 adapted to be engaged by the plate 96 when the center section is in lowered position whereby the abutment 99 engages the plate 96 when the inner section is in operative position for mowing at the desired height. When the center section is raised, it is held in raised position by a safety lock which consists of a pivoted latch member 100 having a detent 101 adapted to engage over a stop plate 102 secured as by bolts 103 to the plate members 93 to retain the rear wheels in lowered position relative to the frame 8 for transportation of the mower apparatus as in Fig. 3. A tongue or drawbar 104 is pivotally mounted as at 105 on the housing 25 and has a forward end 106 adapted to be connected to a drawbar of a tractor or the like for moving the mowing apparatus over terrain to be worked. Bearing members 107 are fixed on the top walls 34 of the side sections and the bottom wall 20 of the center section and depend therefrom to rotatably mount cutter shafts 108 which carry the cutting element 29 for the center section and cutting elements 39 for the side sections, said cutting elements each have cutter bars 109 fixed to the lower end of the shafts 108 with blades 110 secured at apposite ends of said bars whereby rotation of the shafts 108 will rotate the cutters to mow grass, weeds and the like. The axes of the shafts 108 are arranged whereby the swaths cut by the cutting blades overlap as illustrated by the dash lines 111, Fig. 2.

Housings 112 are secured to the top walls 34 of the side sections and bottom wall 20 of the center section and engage the respective upper faces of same to enclose transmission mechanism 113 connecting the upper ends of the shafts 108 with output shafts 114 of respective hydraulic motors 115. In the illustrated structure, the transmission mechanisms 113 each include sprockets 116 and 117 on the shafts 108 and 114 respectively operatively connected by a chain 118. The hydraulic motors 115 are driven as later described.

Hydraulic rams or extensible members 119 are arranged in the enclosure 18 adjacent to and parallel to the side members 14 and 15. The rams have cylinders 120 each having one end pivotally connected to a bracket 121 secured to the bottom wall 20 with piston rods 122 extending from the opposite ends of the cylinders which are toward the rear of the mower. Each of the piston rods 122 have pairs of flexible members such as cables 123 and 123' connected thereto. The cable 123 extends forwardly of the mower under a pulley 124 through an opening 125 in the front transverse member 16 under a pulley 126 pivotally mounted between the forward ends of the arms 67 on the plate 81 with the end of the cable secured as at 127 to a bracket 128 fixed on the upper ends of the respective standards 72 at the same side of the center section of the mower as is the respective ram 120. The cable 123' extends over a pulley 129 fixed to the wall 20 forwardly of the ram and then extends rearwardly under a pulley 130 at the rear of the enclosure 18 and then upwardly through an opening 131 in the rear transverse member 17 with the upper end of the cable secured as at 132 to a bar 133 connecting the forward ends of the bars 102 that are fixed on the members 93 whereby the cables 123' are connected to the rear wheel-carrying members at the side of the center sections to that which the respective ram 120 is adjacent. With this arrangement, extension of the rams 120 will raise the center section relative to the wheels and contraction of the rams 120 will lower the center section toward the ground. The weight of the center section is such that the lowering of the center section is by gravity whereby the rams 120 may be single-acting rams.

Extensible members such as hydraulic rams 134 and 135 are arranged in spaced relation adjacent the rear of the enclosure 18 and each includes cylinders 136 having one end pivotally mounted on a bracket 136' at the rear of the enclosure. Clamps 137 are arranged adjacent the other end of the cylinders to secure same to the bottom wall 20 of the enclosure. Piston rods 138 extend from said other ends of the ram cylinders and carry pulleys 139. Springs 140 each have one end suitably secured to the forward transverse member 16 and the other end secured as at 141 to flexible members such as cables 142 which extend around pulleys 143 carried by the brackets 136 and then forwardly over the pulleys 139, then rearwardly under pulleys 144 carried by the brackets 136 on the opposite sides of the respective cylinders, then upwardly over pulleys 145 carried by a cross brace 146 connecting the upper ends of the rear standard 89, and then over arcuate arms 147 mounted in upstanding relation on the top walls of the respective side sections, the cables being secured as at 148 to said arcuate arms. Blocks 149 are secured to the top walls 34 of the side sections adjacent the arcuate arms 147 to serve as bumpers as later described. The arcuate arms 147 are positioned laterally beyond the longitudinal center of the side sections to provide a leverage whereby elongation of the rams 134 and 135 swing the side sections 9 and 10 upwardly on the hinge members 11 and 12. The springs 140 merely keep the cables 142 taut for movement of the side sections to angular relation relative to the center section in following the contour of terrain, as illustrated in Fig. 5.

Leaf springs 150 are mounted on the exterior of each of the side members 14 and 15 and have free ends 150' adapted to engage wear plates 151 on the side section top walls 34 when the side sections are raised to their uppermost limit to provide a resiliency cooperating with the springs 140 forming a resilient retention holding the blocks or bumpers 149 in engagement with the sides of the rear standards 89 when the side sections are in elevated position as illustrated in Fig. 3. The springs 149 also tend to urge the side sections outwardly when the rams 134 and 135 are contracted whereby gravity will continue the lowering of the side sections in response to reduction of pressure in the respective rams which are single-acting rams.

The pumps 5, 6 and 7 each draw hydraulic fluid from a reservoir 152 and supply fluid under pressure to pressure-relief valves 153, 154 and 155 mounted on the reservoir and set for a desired maximum pressure which, when exceeded, will cause the excess fluid to return to the reservoir through said valve. When the relief valve port is closed, as in normal operation, the fluid pressure from the respective pump is supplied through conduits 156, 157 and 158 connecting the respective relief valves to the respective hydraulic motors 115, with the discharge of the motors being connected through conduits 159 to the reservoir 152. The control of the operation of the hydraulic motors 115 is through a gear shift lever 4' on the transmission housing 4 which, while in neutral, allows the pumps 5, 6 and 7 to be idle, and which when moved to effect the drive to the pumps causes each of the pumps to supply hydraulic fluid to the respective hydraulic motors 115.

The pump 3 has its intake connected by a conduit 160 to the reservoir 152 to supply fluid under pressure through a conduit 161 through a pressure relief valve 162 set at a predetermined maximum pressure whereby when the pressure is exceeded the valve is opened to return the excess pressure through the conduit 163 to the reservoir. Hydraulic fluid is normally supplied through the relief valve 162 to a valve 164 which is set whereby the fluid is either returned to the reservoir 152 or is supplied through a conduit 165 through valves 166 and 167 and normally then to the return duct 163 to the reservoir. Operation of the valve 166 will selectively supply hydraulic fluid to the rams 134 and 135 or to both of them and may also be moved to hold the pressure in the rams to maintain the center section in elevated position. Operation of the valve 167 will selectively supply hydraulic fluid to either or both of the rams 120 to selectively raise either side of or the entire center section and may also be moved to lock the pressure in said rams to maintain the center section in elevated position.

The center section has a depending member 170 extending transversely thereof adjacent the rear of the frame forming a transverse reinforcing for the bottom wall 20. Extending rearwardly from the transverse member is a vane 171 which is in a vertical plane that tends to prevent grass and the like from being thrown from the cutter of one side section over to the other side section and cooperates with the gusset members 60 to substantially spread the cuttings and prevent excessive windrowing of same. The drawbar 104 has an upstanding member 172 with a U-shaped support 173 thereon and the center section has posts 174 with loops 175 at the upper ends thereof to serve as supports for the hoses or conduits leading to the various hydraulic equipment.

In operating a mower structure constructed and assembled as described, the valves 164, 166 and 167 are operated to supply fluid pressure to the rams 120, 134 and 135 to raise the center section and also the side sections to a position shown in Fig. 3. The pins 87 are then inserted and the latches 101 moved to lock the center section in elevated position. The mower is then pulled to an area to be mowed and the pins 87 are removed and the latches 101 released, and the valves 166 and 167 operated to bleed the pressure from the respective rams to lower the center and side sections to mowing position wherein the height is governed by the stops 99 and 85. The lever 4' is then moved to cause driving of the pumps 5, 6 and 7 which supplies hydraulic fluid to the hydraulic motors 115 to drive the cutter bars, causing same to rotate to mow the grass, weeds and the like. The cutter blades 110 are preferably sharpened on both edges so they are reversible and they are also set at an angle to the bars 109, as shown in Fig. 3, to increase the cutting ability and cause the grass and the like to be swept by centrifugal force from the cutting edges making a self-cleaning action. The sections can follow the contours as shown in Fig. 5, however, if a post or other obstruction should be in the path, the valves can be operated to lift the respective section until the obstruction is passed.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A vegetation mower construction adapted to be drawn over terrain adjacent a highway comprising; a center section having mowing means thereunder and a pair of laterally extending side sections having mowing means thereunder; means connecting said side sections respectively to opposite side edges of said center section for permitting upward and downward inclination of said side sections with respect to said center section; means maintaining the outer edges of said side sections a selected distance from said terrain; a pair of forward and a pair of rearward ground-engaging wheels at the side edges of said center section providing mobile support therefor; said center section wheels each being part of a wheel assembly including a vertical standard, guides in said assemblies associated with said standards, said guides being adapted to slide vertically on said standards to permit said center section to move vertically with respect to said wheels, a pair of remote controlled extensible means secured to said center section, a pair of cables secured to each of said extensible means, each pair of cables being associated with one side edge of said center section, and cable guide means secured to said center section adjacent each of said vertical standards, said cables each being guided beneath one of said cable guide means and secured to one of said wheel assemblies whereby the extension of said extensible means determines the height of said wheels with respect to said center section and permits the side edges of said center section to be independently adjusted in vertical distance from the terrain while automatically remaining parallel to the terrain.

2. A vegetation mower construction adapted to be drawn over terrain adjacent a highway comprising; a center section having mowing means thereunder and a pair of laterally extending side sections having mowing means thereunder; hinges connecting said side sections respectively to opposite side edges of said center section for permitting upward and downward inclination of said side sections with respect to said center section, means maintaining the outer edges of said side sections a selected distance from said terrain, a pair of forward and a pair of rearward ground-engaging wheels at the side edges of said center section providing mobile support therefor, said forward center section wheels each being supported on a vertical standard, forward guides secured to said center section, said forward guides being adapted to slide vertically on said forward vertical standards, a pair of rear vertical standards secured to said center section, said rearward center section wheels each being supported on a rear guide, said rear guides being adapted to slide vertically on said rear standards, a pair of remote controlled extensible means secured to said center section, a pair of cables secured to each of said extensible means, guide means secured to said center section adjacent each of said vertical standards, one cable in each of said pairs of cables being guided beneath one of said guide means and being secured to a respective forward standard adjacent the top thereof, one cable in each of said pairs of cables extending beneath one of said guide means and being secured to a respective rear guide, each pair of cables being associated with one side edge of said center section, and guide means secured to said center section adapted to cause both cables in each of said pairs of cables to increase in tension in response to extension of the respective extensible means permitting the side edges of said center section to be independently adjusted in vertical distance from the terrain while automatically remaining parallel to the terrain.

3. A vegetation mower construction adapted to be drawn over terrain adjacent a highway comprising; a planar substantially rectangular center section having mowing means thereunder and a pair of planar, laterally extending side sections having mowing means thereunder; hinges connecting said side sections respectively to opposite side edges of said center section for permitting upward and downward inclination of said side sections with respect to said center section; a pair of forward and a pair of rearward ground-engaging wheels providing mobile support for said center section at each corner thereof; forward and rearward ground-engaging wheels providing mobile support for the outer edges of said side sections, a supporting surface between said forward and rearward center section wheels, said forward center section wheels each being supported on a vertical standard, a forward guide secured to said center section at each forward corner thereof, said forward guides being adapted to slide vertically on said forward vertical standards, a rear vertical standard secured to said center section at each rear corner thereof, said rearward center section wheels each being supported on a rear guide, said rear guides being adapted to slide vertically on said rear standards; a pair of remote controlled hydraulic cylinders secured to said center section and arranged in spaced relation on said supporting surface, a rod in each of said cylinders and extensible with respect thereto, a pair of cables secured to each of said rods, pulleys secured to said center section adjacent each of said vertical standards, one cable in each of said pairs of cables depending beneath one of said pulleys and being secured to a respective forward standard adjacent the top thereof, one cable in each of said pairs of cables extending beneath one of said pulleys and being secured to a respective rear guide, each pair of cables being associated with one side edge of said center section, and pulleys secured to said center section and adapted to cause both cables in each of said pairs of cables to increase tension in response to the extension of the respective rods permitting the side edges of said center section to be independently adjusted in a vertical distance from the terrain while automatically remaining parallel to the terrain.

4. A vegetation mower construction adapted to be drawn over terrain adjacent a highway comprising; a planar, substantially rectangular center section having mowing means thereunder and a pair of planar, laterally extending side sections having mowing means thereunder; hinges connecting said side sections respectively to opposite side edges of said center section for permitting upward and downward inclination of said side sections with respect to said center section; a pair of forward and a pair of rearward ground-engaging wheels providing mobile support for said center section at each corner thereof; forward and rearward ground-engaging wheels providing mobile support for the outer edges of said side sections, a box-like enclosure between said forward and rearward center section wheels, said forward center section wheels each being supported on a vertical standard, a forward guide secured to said center section at each forward corner thereof, said forward guides being adapted to slide vertically on said forward vertical standards, a rear vertical standard secured to said center section at each rear corner thereof, said rearward center section wheels each being supported on a rear guide, said rear guides being adapted to slide vertically on said rear standards; a pair of remote controlled hydraulic cylinders secured to said center section and arranged in spaced relation in said enclosure, a rod in each of said cylinders and extensible with respect thereto, a pair of cables secured to each of said rods, pulleys secured to said center section adjacent each of said vertical standards, one cable in each of said pairs of cables depending beneath one of said pulleys and being secured to a respective forward standard adjacent the top thereof, one cable in each of said pairs of cables extending beneath one of said pulleys and being secured to a respective rear guide, each pair of cables being associated with one side of said center section, pulleys secured to said center section in said enclosure and adapted to cause both cables in each of said pairs of cables to increase in tension in response to movement of the respective rods permitting the side edges of said center section to be independently adjusted in vertical distance from the terrain while automatically remaining parallel to the terrain, and remote controlled means for inclining said side sections upwardly with respect to said center section from a terrain-engaging position to a position substantially at right angles with respect to said center section.

5. A vegetation mower construction adapted to be drawn over terrain adjacent a highway comprising; a planar, substantially rectangular center section having mowing means thereunder and a pair of planar, laterally extending side sections having mowing means thereunder; hinges connecting said side sections respectively to opposite side edges of said center section for permitting upward and downward inclination of said side sections with respect to said center section; a pair of forward and a pair of rearward ground-engaging wheels providing mobile support for said center section at each corner thereof, forward and rearward ground-engaging wheels providing mobile support for the outer edges of said side sections, a box-like enclosure between said forward and said rearward center section wheels, said forward center section wheels each being supported on a vertical standard, a forward guide secured to said center section at each forward corner thereof, said forward guides being adapted to slide vertically on said forward vertical standards, a rear vertical standard secured to said center section at each corner thereof, said rearward center section wheels each being supported on a rear guide, said rear guides being adapted to slide vertically on said rear standards, a pair of remote controlled hydraulic cylinders secured to said center section and arranged in spaced relation in said enclosure, a rod in each of said cylinders and movable with respect thereto, a pair of cables secured to each of said rods, pulleys secured to said center section adjacent each of said vertical standards, one cable in each of said pairs of cables depending beneath one of said pulleys and being secured to a respective forward standard adjacent the top thereof, one cable in each of said pairs of cables extending beneath one of said pulleys and being secured to a respective forward standard adjacent the top thereof, one cable in each of said pairs of cables extending beneath one of said pulleys and being secured to a respective rear guide, each pair of cables being associated with one side of said center section, pulleys secured to said center section in said enclosure and adapted to cause both cables in each of said pairs of cables to increase in tension in response to movement of the repective rods permitting the side edges of said center section to be independently adjusted in vertical distance from the terrain while automatically remaining parallel to the terrain, remote controlled means for inclining said side sections upwardly with respect to said center sections from a terrain-engaging position to a position substantially at right angles with respect to said center section, and spring means located between said side sections and said center section and adapted to resiliently urge said side sections outwardly thereof when said side sections are substantially at right angles to said center section whereby said mower exhibits great versatility in mowing terraced terrain including terrain having open drain channels therein.

References Cited in the file of this patent

UNITED STATES PATENTS

| | | |
|---|---|---|
| 1,055,913 | Howell | Mar. 11, 1913 |
| 2,519,002 | Stemen et al. | Aug. 15, 1950 |
| 2,603,052 | Pelham | July 15, 1952 |
| 2,672,000 | Speiser | Mar. 16, 1954 |
| 2,687,073 | Thorp | Aug. 24, 1954 |
| 2,687,309 | Anders | Aug. 24, 1954 |
| 2,690,040 | Miller et al. | Sept. 28, 1954 |
| 2,743,567 | Martin | May 1, 1956 |
| 2,753,674 | Cunningham et al. | July 10, 1956 |
| 2,818,269 | Northcote et al. | Dec. 31, 1957 |
| 2,834,603 | Bell | May 13, 1958 |